(12) United States Patent
Pankaj et al.

(10) Patent No.: US 11,274,557 B2
(45) Date of Patent: Mar. 15, 2022

(54) DAMPER ASSEMBLIES FOR ROTATING DRUM ROTORS OF GAS TURBINE ENGINES

(71) Applicant: General Electric Company, Schenectady, NY (US)

(72) Inventors: Peeyush Pankaj, Bangalore (IN); Narayanan Payyoor, Bangalore (IN); Shashank Suresh Puranik, Bangalore (IN)

(73) Assignee: General Electric Company, Schenectady, NY (US)

( * ) Notice: Subject to any disclaimer, the term of this patent is extended or adjusted under 35 U.S.C. 154(b) by 54 days.

(21) Appl. No.: 16/697,446

(22) Filed: Nov. 27, 2019

(65) Prior Publication Data
US 2021/0156257 A1 May 27, 2021

(51) Int. Cl.
*F01D 5/10* (2006.01)
*F01D 25/16* (2006.01)
(Continued)

(52) U.S. Cl.
CPC .............. *F01D 5/10* (2013.01); *F01D 5/03* (2013.01); *F01D 5/06* (2013.01); *F01D 25/164* (2013.01);
(Continued)

(58) Field of Classification Search
CPC ...... F01D 25/16; F01D 25/162; F01D 25/164; F01D 5/03; F01D 5/06; F02C 3/067; F16C 13/006; F16C 13/04
See application file for complete search history.

(56) References Cited

U.S. PATENT DOCUMENTS 2,028,603 A * 1/1936 John ................ F01D 5/03
 415/100
2,269,700 A * 1/1942 Treshow ............ F27B 7/22
 248/130
(Continued)

FOREIGN PATENT DOCUMENTS

CA 2841592 A1 10/2014
CA 2861292 A1 6/2015
(Continued)

OTHER PUBLICATIONS

U.S. Appl. No. 16/394,180, filed Apr. 25, 2019.
(Continued)

*Primary Examiner* — Topaz L. Elliott
(74) *Attorney, Agent, or Firm* — Dority & Manning, P.A.

(57) ABSTRACT

A gas turbine engine includes a rotatable drum rotor having a plurality of blades secured thereto. The blades extend radially inward of the rotatable drum rotor. The gas turbine engine also includes a support frame mounted radially outward of the rotating drum rotor and a rotor support system having a bearing assembly positioned between the rotatable drum rotor and the support frame. The bearing assembly includes, at least, a stationary component and at least one rotatable component. Further, the gas turbine engine includes a damper assembly for securing between the support frame and the rotatable drum rotor. Moreover, the damper assembly includes at least one damper secured between the support frame and the stationary component of the bearing assembly or to a surface of the rotatable drum rotor. As such, the damper(s) is configured to provide damping to the rotatable drum rotor during operation of the gas turbine engine.

14 Claims, 7 Drawing Sheets

(51) Int. Cl.
*F02C 7/06* (2006.01)
*F01D 5/03* (2006.01)
*F01D 5/06* (2006.01)

(52) U.S. Cl.
CPC ............ *F02C 7/06* (2013.01); *F05D 2240/50* (2013.01); *F05D 2260/96* (2013.01)

(56) References Cited

U.S. PATENT DOCUMENTS

| | | | |
|---|---|---|---|
| 2,445,661 A | | 7/1948 | Constant |
| 2,509,442 A | * | 5/1950 | Matheisel ................. F01D 5/03 415/91 |
| 3,015,524 A | * | 1/1962 | Slayter .................. F01D 25/162 384/117 |
| 3,295,801 A | * | 1/1967 | Mcdowall ............. F16C 27/063 248/610 |
| 3,416,723 A | | 12/1968 | Schmitz et al. |
| 3,436,062 A | * | 4/1969 | Vladimirovich .......... F27B 7/22 248/130 |
| 3,705,775 A | | 12/1972 | Rioux |
| 4,451,110 A | * | 5/1984 | Forestier ............... F01D 25/164 384/582 |
| 4,496,252 A | | 1/1985 | Horler |
| 5,074,109 A | | 12/1991 | Mandet et al. |
| 5,088,840 A | | 2/1992 | Radtke |
| 5,272,868 A | | 12/1993 | Ciokajlo et al. |
| 5,320,134 A | | 6/1994 | Singh |
| 5,752,774 A | * | 5/1998 | Heshmat ............. F16C 32/0442 384/549 |
| 5,974,782 A | | 11/1999 | Gerez |
| 6,009,701 A | | 1/2000 | Freeman et al. |
| 6,082,959 A | | 7/2000 | Van Duyn |
| 6,099,165 A | | 8/2000 | Tremaine |
| 6,109,022 A | | 8/2000 | Allen et al. |
| 6,240,719 B1 | | 6/2001 | Vondrell et al. |
| 6,325,546 B1 | | 12/2001 | Storace |
| 6,491,497 B1 | | 12/2002 | Allmon et al. |
| 6,494,032 B2 | | 12/2002 | Udall |
| 6,783,319 B2 | | 8/2004 | Doerflein |
| 6,796,408 B2 | | 9/2004 | Sherwin et al. |
| 6,799,416 B2 | | 10/2004 | Plona |
| 7,004,047 B2 | | 2/2006 | Rey et al. |
| 7,097,413 B2 | | 8/2006 | VanDuyn |
| 7,195,444 B2 | | 3/2007 | Brault et al. |
| 7,404,678 B2 | | 7/2008 | Plona |
| 7,448,808 B2 | | 11/2008 | Bouchy |
| 7,669,799 B2 | | 3/2010 | Elzey |
| 7,749,341 B2 | | 7/2010 | Noebe et al. |
| 7,832,193 B2 | | 11/2010 | Orlando |
| 7,926,259 B2 | | 4/2011 | Orlando |
| 8,100,638 B2 | | 1/2012 | Udall |
| 8,128,339 B2 | | 3/2012 | Kondo |
| 8,136,999 B2 | | 3/2012 | Mons et al. |
| 8,167,531 B2 | | 5/2012 | Mollmann et al. |
| 8,246,255 B2 | | 8/2012 | Raberin et al. |
| 8,267,650 B2 | | 9/2012 | Alam et al. |
| 8,291,710 B2 | | 10/2012 | Webster |
| 8,371,802 B2 | | 2/2013 | Udall |
| 8,403,634 B2 | | 3/2013 | Arness et al. |
| 8,409,691 B1 | | 4/2013 | Henry et al. |
| 8,430,622 B2 | | 4/2013 | Webster et al. |
| 8,434,293 B2 | | 5/2013 | Widdle, Jr. et al. |
| 8,662,756 B2 | | 3/2014 | Care et al. |
| 8,726,652 B1 | | 5/2014 | Gunter |
| 8,834,095 B2 | | 9/2014 | Davis |
| 8,945,325 B2 | | 2/2015 | Everhart et al. |
| 8,986,146 B2 | | 3/2015 | Gallet |
| 9,051,877 B2 | | 6/2015 | Sabnis |
| 9,140,137 B2 | | 9/2015 | Mayer et al. |
| 9,353,754 B2 | | 5/2016 | Gehlot et al. |
| 9,482,384 B2 | * | 11/2016 | Stuble ................... F16M 11/04 |
| 9,534,608 B2 | | 1/2017 | Gehlot et al. |
| 10,274,017 B2 | | 4/2019 | Ganiger et al. |
| 10,634,007 B2 | * | 4/2020 | Ghosh ................. F16C 35/063 |
| 10,746,047 B2 | * | 8/2020 | Wesling ................. F16C 17/03 |
| 10,851,670 B2 | * | 12/2020 | Choi ..................... F16C 17/03 |
| 2002/0159882 A1 | * | 10/2002 | Crall ......................... F01D 5/16 415/119 |
| 2005/0222683 A1 | | 10/2005 | Berry |
| 2006/0093466 A1 | * | 5/2006 | Seda ...................... F01D 25/16 415/68 |
| 2006/0169857 A1 | | 8/2006 | Hawkins et al. |
| 2006/0269357 A1 | | 11/2006 | Webb |
| 2007/0157597 A1 | | 7/2007 | Sharp |
| 2008/0181763 A1 | | 7/2008 | Webster et al. |
| 2009/0148274 A1 | | 6/2009 | Kostka et al. |
| 2009/0185768 A1 | | 7/2009 | Mons et al. |
| 2010/0083632 A1 | * | 4/2010 | Foster ................... B64D 27/16 60/39.181 |
| 2010/0310374 A1 | | 12/2010 | Dehlsen |
| 2011/0150378 A1 | | 6/2011 | Care et al. |
| 2012/0056005 A1 | | 3/2012 | Webster |
| 2012/0134838 A1 | | 5/2012 | Ramirez Jimenez et al. |
| 2013/0324343 A1 | | 12/2013 | Gallet |
| 2014/0369830 A1 | | 12/2014 | Fletcher et al. |
| 2015/0144256 A1 | | 5/2015 | Fabre et al. |
| 2016/0003408 A1 | * | 1/2016 | Stuble ................... F16M 11/42 248/349.1 |
| 2016/0229519 A1 | | 8/2016 | Dilligan et al. |
| 2016/0298539 A1 | * | 10/2016 | Roberge ................. F02C 3/107 |
| 2017/0234157 A1 | | 8/2017 | Khan et al. |
| 2018/0112554 A1 | | 4/2018 | Ghosh et al. |
| 2018/0112672 A1 | | 4/2018 | Ganiger et al. |
| 2018/0135596 A1 | | 5/2018 | Herrig et al. |
| 2018/0298822 A1 | * | 10/2018 | Ac ........................... F02C 7/20 |
| 2019/0078465 A1 | * | 3/2019 | Choi ....................... F16C 17/02 |
| 2019/0128137 A1 | * | 5/2019 | Wesling ................. F16C 35/063 |
| 2019/0128329 A1 | | 5/2019 | Ghosh et al. |
| 2019/0145277 A1 | * | 5/2019 | Ghosh ..................... F16C 19/06 384/223 |
| 2019/0178104 A1 | | 6/2019 | Joshi et al. |
| 2020/0284150 A1 | * | 9/2020 | Sultana .................. F01D 5/03 |
| 2021/0040864 A1 | * | 2/2021 | Ganiger ................. F16C 19/26 |

FOREIGN PATENT DOCUMENTS

| | | | | |
|---|---|---|---|---|
| DE | 10259909 A1 | * | 7/2004 | ............ F16C 27/066 |
| DE | 102005021446 B3 | * | 6/2006 | ............ B29C 43/22 |
| EP | 1130243 A2 | | 9/2001 | |
| EP | 1344896 A1 | | 9/2003 | |
| EP | 2339131 A1 | | 6/2011 | |
| EP | 3115551 A1 | | 1/2017 | |
| FR | 1391619 A | * | 3/1965 | ............ B29C 43/22 |
| FR | 2888621 A1 | | 1/2007 | |
| FR | 2938874 A1 | | 11/2008 | |
| GB | 2444935 A | | 6/2008 | |
| JP | H06-200933 A | | 7/1994 | |
| WO | WO2009/095758 A2 | | 8/2009 | |
| WO | WO2010/001716 A1 | | 1/2010 | |

OTHER PUBLICATIONS

Canadian Office Action Corresponding to Application CA3000360 dated Jan. 8, 2019.
ISR and Written Opinion Corresponding to PCT/US2017/033910 dated Aug. 17, 2017.
India Examination Report IN201641022484 dated Apr. 30, 2019.
Barbarino et al., A Review on Shape Memory Alloys With Applications Morphing Aircraft, Smart Materials and Structures, vol. 23, Issue 6, Apr. 2014, pp. 1-19.
Stebner, Development, Characterization, and Application of Ni19.5Ti50.5Pd25Pt5 High-Temperature Shape Memory Alloy Helical Actuators, Masters of Science Thesis University of Akron, Dec. 2007, pp. 1-110.
Wischt et al., Variable Stiffness Technique for Turbomachinery using Shape Memory Alloys, American Institute of Aeronautics and Astronautics SciTech Forum, 56th AIAA/ASCE/AHS/ASC Structures, Structural Dynamics, and Materials Conference, Jan. 5-9, 2015, pp. 1-13.

(56) References Cited

OTHER PUBLICATIONS

SMB Bearings, Full Ceramic Bearing Selection Guide, 1 Page. https://www.smbbearings.com/firebrick/ckeditor/plugins/upload/Uploads/Ceramic_Bearing_Selection_Guide.pdf.

\* cited by examiner

DAMPER ASSEMBLIES FOR ROTATING DRUM ROTORS OF GAS TURBINE ENGINES

FIELD

The present disclosure relates generally to gas turbine engines and, more particularly, to damper assemblies for rotating drum rotors of gas turbine engines.

BACKGROUND

A gas turbine engine generally includes, in serial flow order, an inlet section, a compressor section, a combustion section, a turbine section, and an exhaust section. In operation, air enters the inlet section and flows to the compressor section where one or more axial compressors progressively compress the air until it reaches the combustion section. Fuel mixes with the compressed air and burns within the combustion section, thereby creating combustion gases. The combustion gases flow from the combustion section through a hot gas path defined within the turbine section and then exit the turbine section via the exhaust section.

In particular configurations, the compressor section includes, in serial flow order, a low pressure compressor (LPC) and a high pressure compressor (HPC). The LPC and the HPC may include one or more axially spaced apart stages. Each stage may include a row of circumferentially spaced apart stator vanes and a row of circumferentially spaced apart rotor blades positioned downstream of the row of stator vanes. The stator vanes direct the air flowing through the compressor section onto the rotor blades, which impart kinetic energy into the air to increase the pressure thereof.

The pressurized air exiting the HPC may then flow to a combustor within which fuel is injected into the flow of pressurized air, with the resulting mixture being combusted within the combustor. The high energy combustion products are directed from the combustor along the hot gas path of the engine to a high pressure turbine (HPT) for driving the HPC via a high pressure drive shaft, and then to a low pressure turbine (LPT) for driving the LPC. After driving each of LPT and HPT, the combustion products may be expelled via an exhaust nozzle to provide propulsive jet thrust.

The various rotating drum rotors throughout the various sections of the gas turbine engine (e.g. in the HPC and LPT) typically experience high deflection at their free ends during the bending mode or gyroscopic loading conditions. Accordingly, an improved rotor support system having a damper assembly at the free end of such rotating drum rotors would be welcomed in the technology.

BRIEF DESCRIPTION

Aspects and advantages of the invention will be set forth in part in the following description, or may be obvious from the description, or may be learned through practice of the invention.

In one aspect, the present disclosure is directed to a gas turbine engine. The gas turbine engine includes a rotatable drum rotor having a plurality of blades secured thereto. The blades extend radially inward of the rotatable drum rotor. The gas turbine engine also includes a support frame mounted radially outward of the rotating drum rotor and a rotor support system having a bearing assembly positioned between the rotatable drum rotor and the support frame. The bearing assembly includes, at least, a stationary component and at least one rotatable component. Further, the gas turbine engine includes a damper assembly secured between the support frame and the rotatable drum rotor. Moreover, the damper assembly includes at least one damper secured between the support frame and the stationary component of the bearing assembly or to a surface of the rotatable drum rotor. As such, the damper(s) is configured to provide damping to the rotatable drum rotor during operation of the gas turbine engine.

In another aspect, the present disclosure is directed to a rotor support system for a gas turbine engine. The gas turbine engine includes a rotatable drum rotor and a support frame. The rotor support system includes a bearing assembly configured for positioning between the rotatable drum rotor and the support frame. The bearing assembly includes, at least, a stationary component and at least one rotatable component. Further, the gas turbine engine includes a damper assembly secured between the support frame and the rotatable drum rotor. Moreover, the damper assembly includes at least one damper secured between the support frame and the stationary component of the bearing assembly or to a surface of the rotatable drum rotor. As such, the damper(s) is configured to provide damping to the rotatable drum rotor during operation of the gas turbine engine.

These and other features, aspects and advantages of the present invention will be better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which refers to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
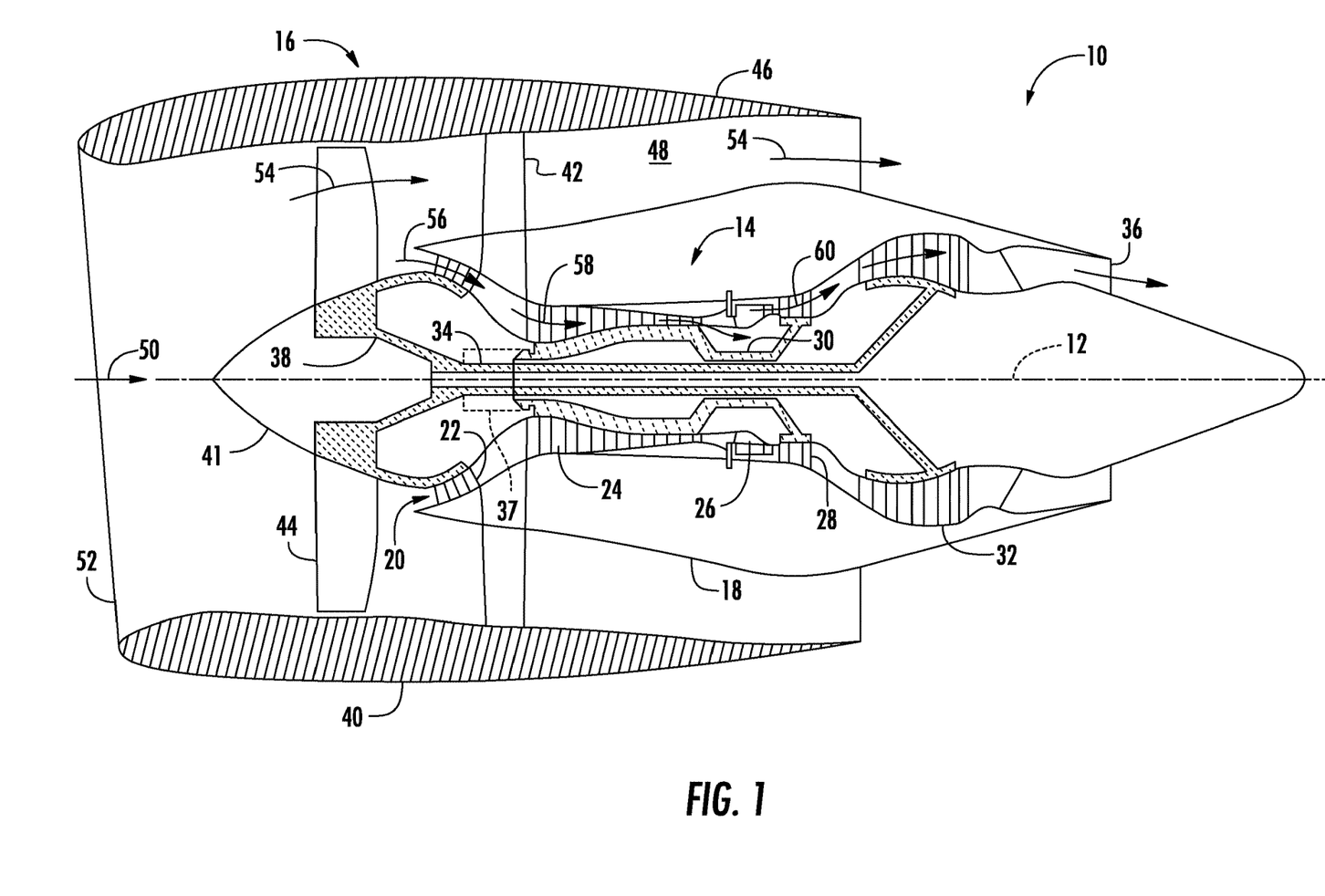
FIG. 1 illustrates a cross-sectional view of one embodiment of a gas turbine engine that may be utilized within an aircraft according to the present disclosure.

Referring now to the drawings, FIG. 1 illustrates a cross-sectional view of one embodiment of a gas turbine engine 10 that may be utilized within an aircraft in accordance with aspects of the present subject matter, with the engine 10 being shown having a longitudinal or axial centerline axis 12 extending therethrough for reference purposes. In general, the engine 10 may include a core gas turbine engine (indicated generally by reference character 14) and a fan section 16 positioned upstream thereof. The core engine 14 may generally include a substantially tubular outer casing 18 that defines an annular inlet 20. In addition, the outer casing 18 may further enclose and support a low pressure, booster compressor 22 for increasing the pressure of the air that enters the core engine 14 to a first pressure level. A high pressure, multi-stage, axial-flow compressor 24 may then receive the pressurized air from the booster compressor 22 and further increase the pressure of such air. The pressurized air exiting the high-pressure compressor 24 may then flow to a combustor 26 within which fuel is injected into the flow of pressurized air, with the resulting mixture being combusted within the combustor 26. The high energy combustion products are directed from the combustor 26 along the hot gas path of the engine 10 to a first (high pressure) turbine 28 for driving the high pressure compressor 24 via a first (high pressure) drive shaft 30, and then to a second (low pressure) turbine 32 for driving the booster compressor 22 and fan section 16 via a second (low pressure) drive shaft 34 that is generally coaxial with first drive shaft 30. After driving each of turbines 28 and 32, the combustion products may be expelled from the core engine 14 via an exhaust nozzle 36 to provide propulsive jet thrust.

Additionally, as shown in FIG. 1, the fan section 16 of the engine 10 may generally include a rotatable, axial-flow fan rotor assembly 38 that is configured to be surrounded by an annular fan casing 40. It should be appreciated by those of ordinary skill in the art that the fan casing 40 may be configured to be supported relative to the core engine 14 by a plurality of substantially radially-extending, circumferentially-spaced outlet guide vanes 42. As such, the fan casing 40 may enclose the fan rotor assembly 38 and its corresponding fan rotor blades 44. Moreover, a downstream section 46 of the fan casing 40 may extend over an outer portion of the core engine 14 to define a secondary, or by-pass, airflow conduit 48 that provides additional propulsive jet thrust.

It should be appreciated that, in several embodiments, the second (low pressure) drive shaft 34 may be directly coupled to the fan rotor assembly 38 to provide a direct-drive configuration. Alternatively, the second drive shaft 34 may be coupled to the fan rotor assembly 38 via a speed reduction device 37 (e.g., a reduction gear or gearbox) to provide an indirect-drive or geared drive configuration. Such a speed reduction device(s) may also be provided between any other suitable shafts and/or spools within the engine as desired or required.

During operation of the engine 10, it should be appreciated that an initial air flow (indicated by arrow 50) may enter the engine 10 through an associated inlet 52 of the fan casing 40. The air flow 50 then passes through the fan blades 44 and splits into a first compressed air flow (indicated by arrow 54) that moves through conduit 48 and a second compressed air flow (indicated by arrow 56) which enters the booster compressor 22. The pressure of the second compressed air flow 56 is then increased and enters the high pressure compressor 24 (as indicated by arrow 58). After mixing with fuel and being combusted within the combustor 26, the combustion products 60 exit the combustor 26 and flow through the first turbine 28. Thereafter, the combustion products 60 flow through the second turbine 32 and exit the exhaust nozzle 36 to provide thrust for the engine 10.

Figure 2:
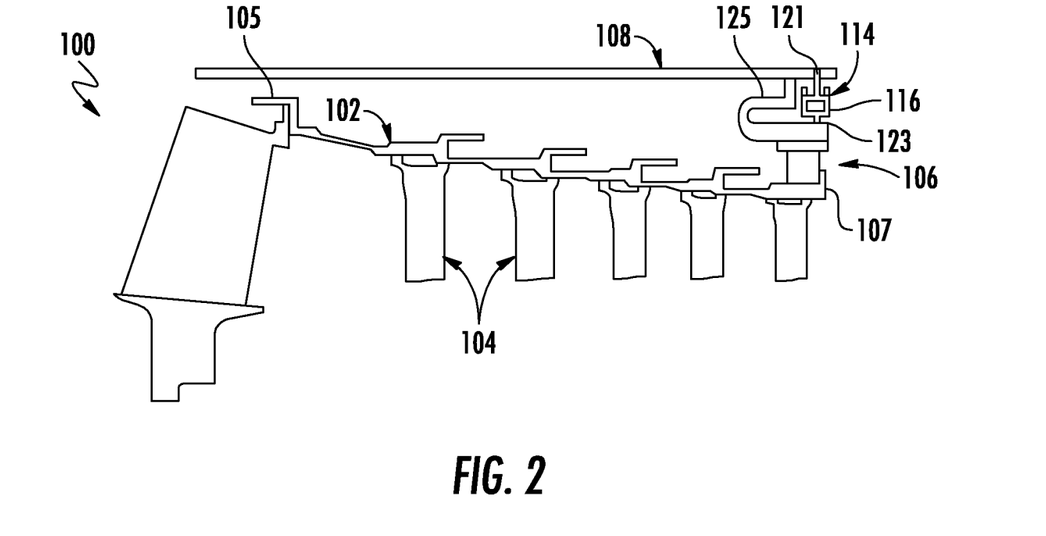
FIG. 2 illustrates a cross-sectional view of one embodiment of a section of a gas turbine engine, particularly illustrating a rotor support system having a damper assembly arranged within a bearing assembly positioned between a rotatable drum rotor and a support frame according to the present disclosure.

Referring now to FIG. 2, a cross-sectional view of one embodiment of a rotor support system 100 suitable for use within a gas turbine engine 10 is illustrated in accordance with aspects of the present subject matter, particularly illustrating the rotor support system 100 installed relative to one of the high pressure compressor 24 or the low pressure turbine 32 of the gas turbine engine 10. Thus, it should be understood that the rotor support system 100 may be part of a compressor section, a turbine section, or a combustion section of the gas turbine engine 10. As shown in FIG. 2, the rotor support system 100 may generally include a rotatable drum rotor 102 configured to support a plurality of blades 104 extending radially inward therefrom. Further, as shown, the rotatable drum rotor 102 has a forward end 105 and an aft end 107.

Still referring to FIG. 2, the rotatable drum rotor 102 may be supported within the engine 10 through one or more bearing assemblies 106 of the rotor support system 100, with each bearing assembly 106 being configured to rotationally support the rotatable drum rotor 102 relative to a structural support frame 108 of the gas turbine engine 10, such as the outer casing 18 of FIG. 1, mounted radially outward of the rotating drum rotor 102. For instance, as shown in FIG. 2, the bearing assembly 106 may be coupled between the rotatable drum rotor 102 and the support frame 108 of the rotor support system 100.

Figure 3:
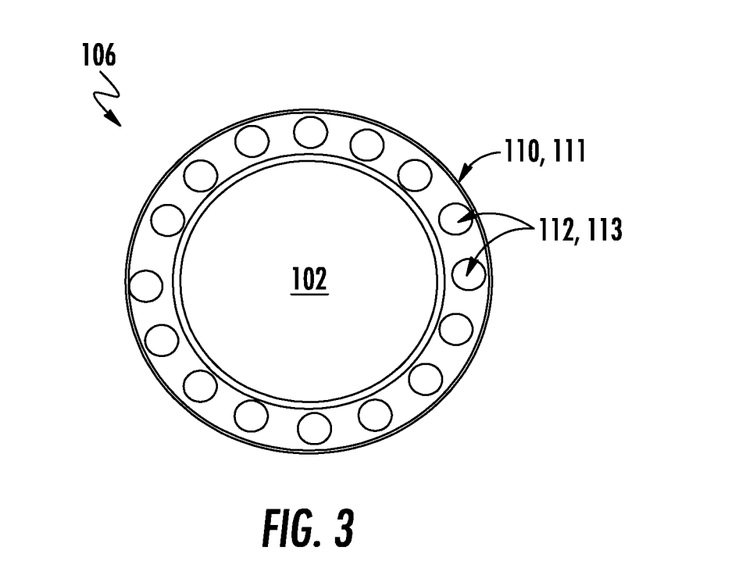
FIG. 3 illustrates a front view of the bearing assembly of the rotor support system of FIG. 2.

Referring to FIGS. 2-5, in several embodiments, the bearing assembly 106 may include, at least, a stationary component 110 and at least one rotating component 112. Further, as shown, the bearing assembly 106 may be positioned at any suitable axial location along the rotatable drum rotor 102, which may be generally cantilevered, such as at the aft end 107. More specifically, as shown in FIGS. 2 and 3, in an embodiment, the stationary component 110 and the rotatable component(s) 112 of the bearing assembly 106 may include a stationary race 111 and a plurality of roller elements 113, respectively. In such embodiments, as shown in FIG. 3, the stationary race 111 may correspond to an outer race of the bearing assembly 106. In alternative embodiments, the stationary race 111 may correspond to an inner race of the bearing assembly 106. The roller elements 113 described herein may generally correspond to any suitable bearing elements, such as balls or rollers.

Figure 4:
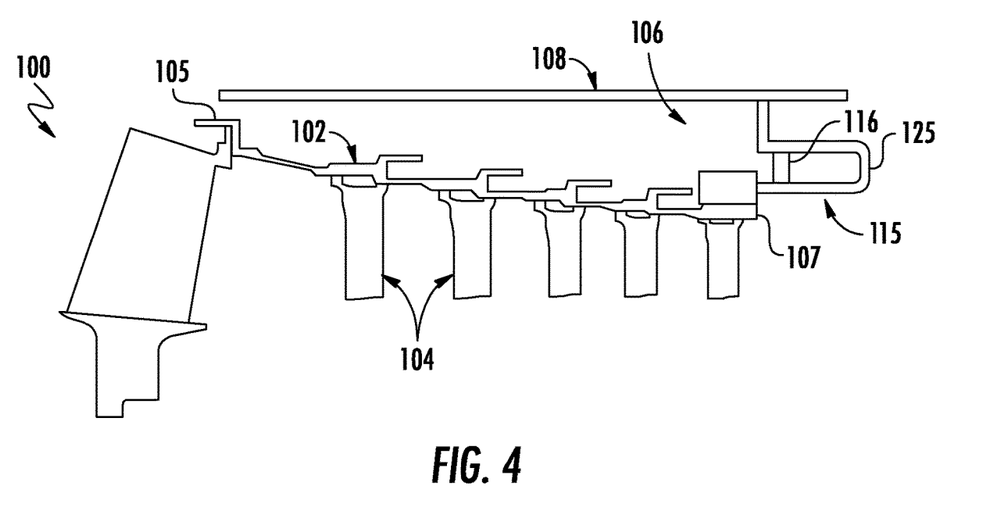
FIG. 4 illustrates a cross-sectional view of another embodiment of a section of a gas turbine engine, particularly illustrating a rotor support system having a damper assembly arranged within a bearing assembly positioned between a rotatable drum rotor and a support frame according to the present disclosure.
Figure 5:
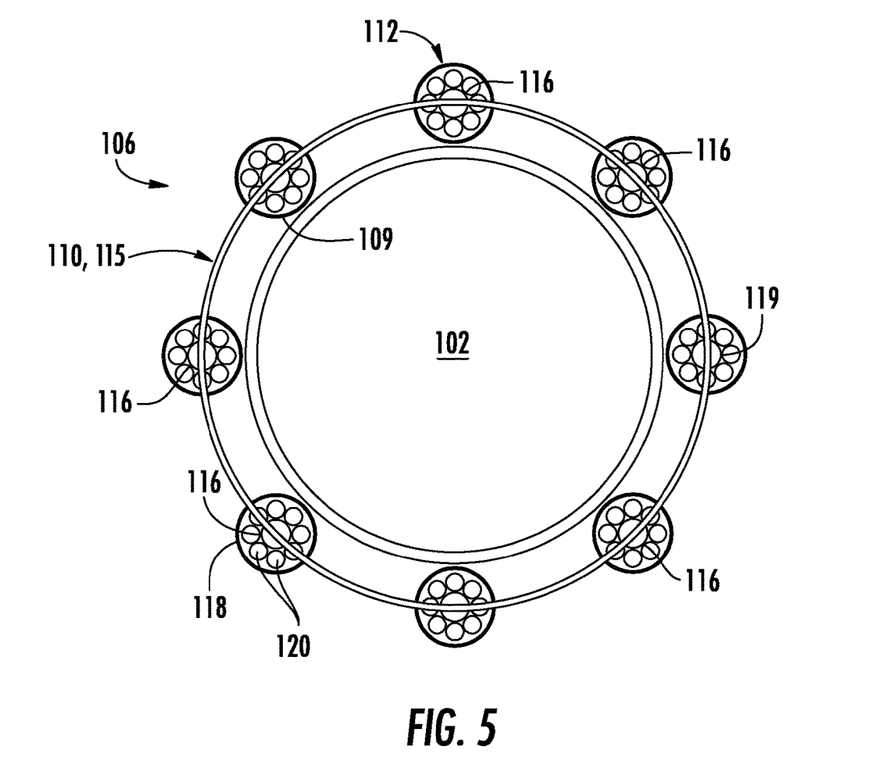
FIG. 5 illustrates a front view of the bearing assembly of the rotor support system of FIG. 4.
Figure 6:
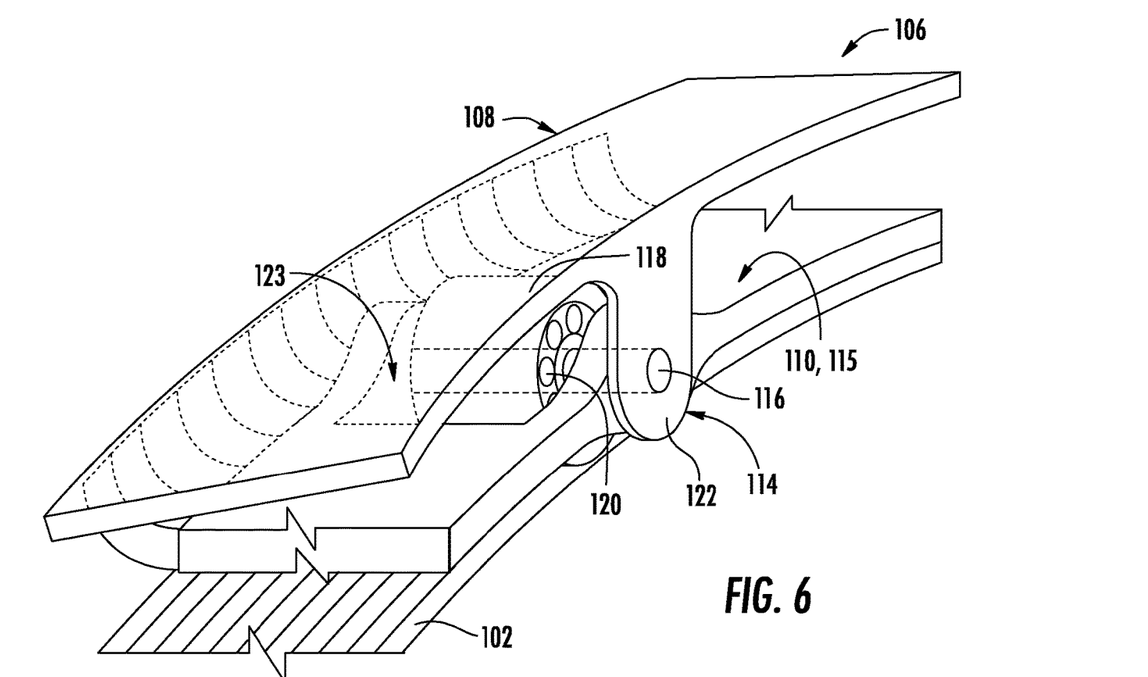
FIG. 6 illustrates a partial, perspective view of one embodiment of one of the bearing and damper assemblies of the rotor support system according to the present disclosure.
Figure 7:
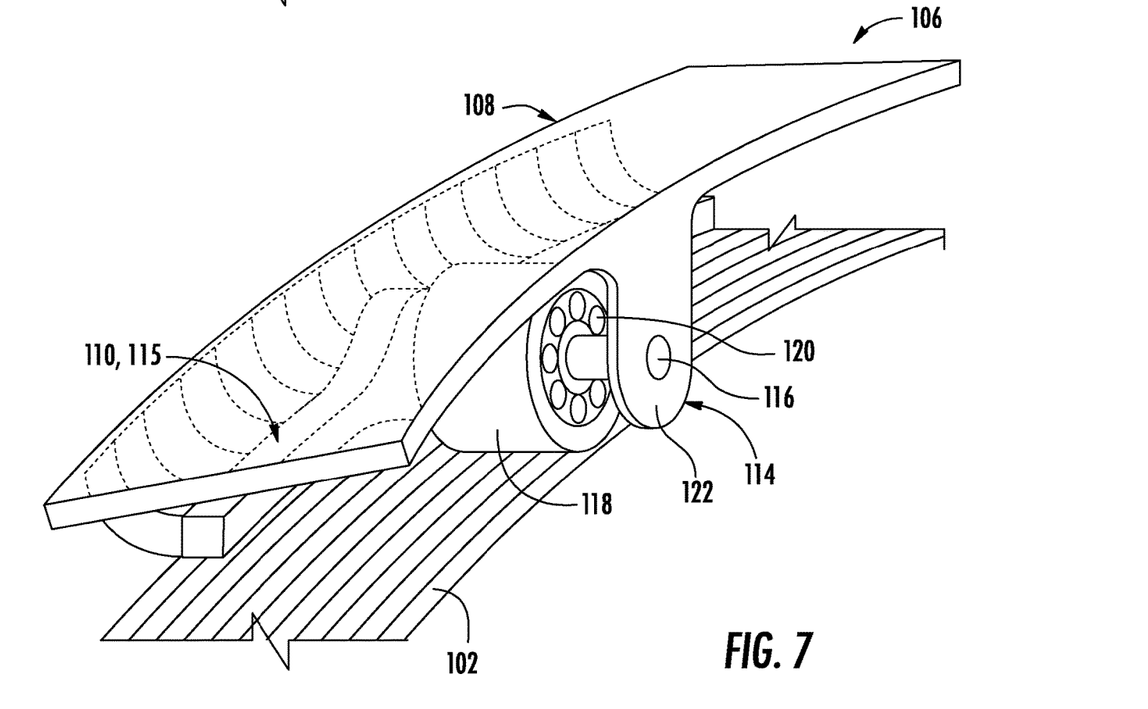
FIG. 7 illustrates a partial, perspective view of another embodiment of one the bearing and damper assemblies of the rotor support system according to the present disclosure.

Referring to FIGS. 4-7, various views of additional embodiments of the bearing assembly 106 according to the present disclosure are illustrated. As shown in each of FIGS. 5-7, the stationary component 110 and the rotatable component(s) 112 of the illustrated bearing assembly 106 may include a stationary support frame 115 and a plurality of roller bearings 116, respectively. For example, as shown in FIGS. 5-7, the stationary support frame 115 may extend circumferentially around the rotating drum rotor 102 and through the inner races 119 of each of the roller bearings 116. Moreover, as shown, the roller bearings 116 may be circumferentially spaced about the rotatable rotor drum 102 and secured to the support frame 108 via the stationary support frame 115.

In addition, as shown generally in FIGS. 2 and 6-7, the rotor support system 100 may further include a damper assembly 114 secured between the support frame 108 and the stationary component 110 of the bearing assembly 106. Moreover, the damper assembly 114 includes at least one damper 117 configured to provide damping to the rotatable drum rotor 102 during operation of the gas turbine engine 10. For example, the damper(s) 117 may include a shape memory alloy damper, a metal damper, a fluid-based damper, one or more sleeve dampers (e.g. such as ring-shaped dampers), a spring-type damper, and/or combinations thereof.

In addition, in certain embodiments, as shown in FIGS. 2 and 4, the damping assembly 114 may also include a squirrel cage 125 (or spring finger design) that is used to support the rotatable drum rotor 102 and to provide a desired flexibility/stiffness and also provide centering for the damping assembly. For example, as shown, the squirrel cage 125 has a U-shape, although it should be understood that the squirrel cage 125 may have any suitable shape so as to provide the desired flexibility/stiffness and/or to accommodate the damper assembly 114.

Thus, in several embodiments, as shown in FIG. 2, the damper(s) 117 described herein may extend lengthwise between a first end 121 and a second end 123, with the first end 121 being coupled to the support frame 108 and the second end 123 being coupled to the stationary component 110 (or directly to the squirrel cage 125). In addition, as shown in FIG. 2, individual dampers 117 of the damper assembly 114 may have a spring-like configuration and/or any suitable shape or configuration that provides a desired flexibility. Thus, in an embodiment, the damper(s) described herein may be pre-strained.

As indicated above, the damper(s) 117 described herein may, in several embodiments, be formed from any suitable material, such as metal or a shape memory alloy, e.g. to allow the damper(s) 117 to deform during high loading events and then regain its original shape during normal loading events. For metal damper(s) 117, the friction between the metallic damper and the surface of the rotatable drum rotor 102 (e.g. different E values) causes damping.

For shape memory alloy damper(s) 117, the material allows the damper(s) to undergo a large recoverable deformation without failing when the loads being transmitted between the support frame 108 and rotatable drum rotor 102 exceed the predetermined load threshold. Such deformation may allow for a reduced support stiffness to be provided between the support frame 108 and the bearing assembly 106 during the high loading event, thereby allowing the increased loads to be absorbed or dampened by the system 100. In certain embodiments, for example, the shape memory alloys described herein can be designed to be strained higher than super-elastic limit of material, but less than the plastic limit so as to obtain the desired damping (geometry or pre-straining or both to achieve this). In addition, the shape memory alloys described herein provide large hysteresis when operating at cyclic loads higher than the super-elastic limit and within the plastic limit. This energy-dissipation capability is what provides the damping for the material. Furthermore, it should be understood that the design and/or geometry and/or the material of the dampers 117 described herein can be optimized based on specific rotor modes being mitigated. In particular embodiments, the damper(s) 117 may also be formed from a super-elastic, metal-based shape memory alloy. For instance, a suitable super-elastic, metal-based shape memory alloy may include, but is not limited to, a nickel-titanium (NiTi) alloy, a NiTi-based alloy (e.g., a nickel-titanium-hafnium (NiTiHf) alloy, a nickel-titanium-vanadium (NiTiVd) alloy, a nickel-titanium-palladium (NiTiPd) alloy, a nickel-titanium-copper (NiTiCu), a nickel-titanium-niobium (NiTiNb) alloy), a nickel-aluminum-copper (Ni—Al—Cu) alloy and other non-nickel based alloys, such as titanium-niobium (Ti—Nb) alloys, copper-zinc-aluminum (CuZnAl) alloys, and copper-aluminum-beryllium (CuAlBe) alloys.

Figure 8:
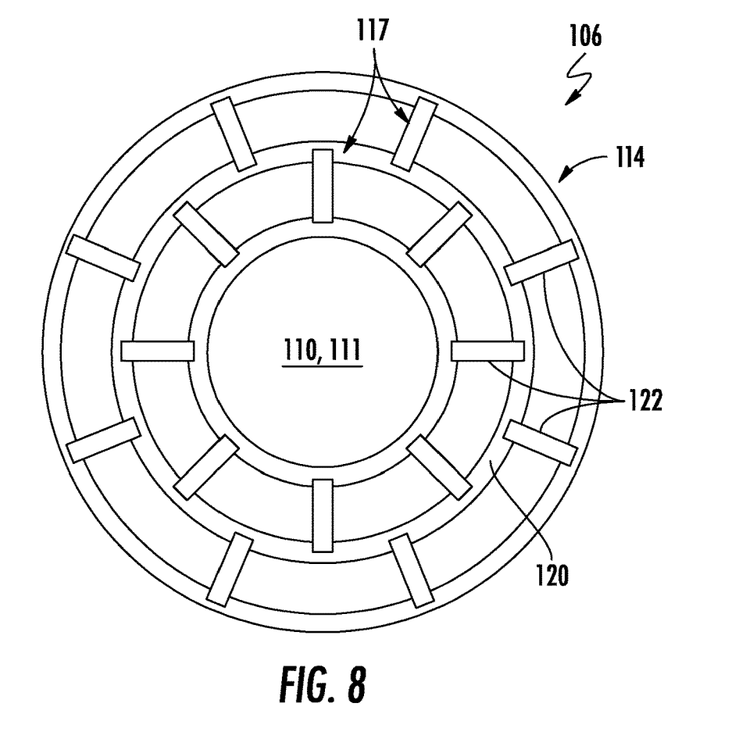
FIG. 8 illustrates a front view of another embodiment of a bearing assembly of the rotor support system according to the present disclosure.

Referring now to FIGS. 8-12, various views of the bearing assembly 106 of the present disclosure are provided, particularly illustrating different configurations of the damping assembly 114 described herein that provide a large hysteresis/damping under specific loading conditions. For example, as shown generally in FIGS. 8-12, in an embodiment, the damper assembly 114 may include a plurality of circumferentially-spaced dampers 117, e.g. circumferentially spaced around the outer race of the bearing assembly 106. More specifically, as shown in FIG. 8, in an embodiment, the damper(s) 117 of the damper assembly 114 may include one or more ring-shaped members 120 connected via one or more radially-extending struts 122 (also shown in FIGS. 6 and 7). In such embodiments, the radial struts 122 are configured to provide sufficient stiffness to the damping structure while being exercised to a super elastic limit. The ring-shaped member(s) 120 is also configured to deflect, thereby providing additional damping and hoop strength to prevent buckling. In such embodiments, the ring-shaped member(s) 120 and/or the radial struts 122 may be constructed of the shape memory alloys described herein.

Figure 9:
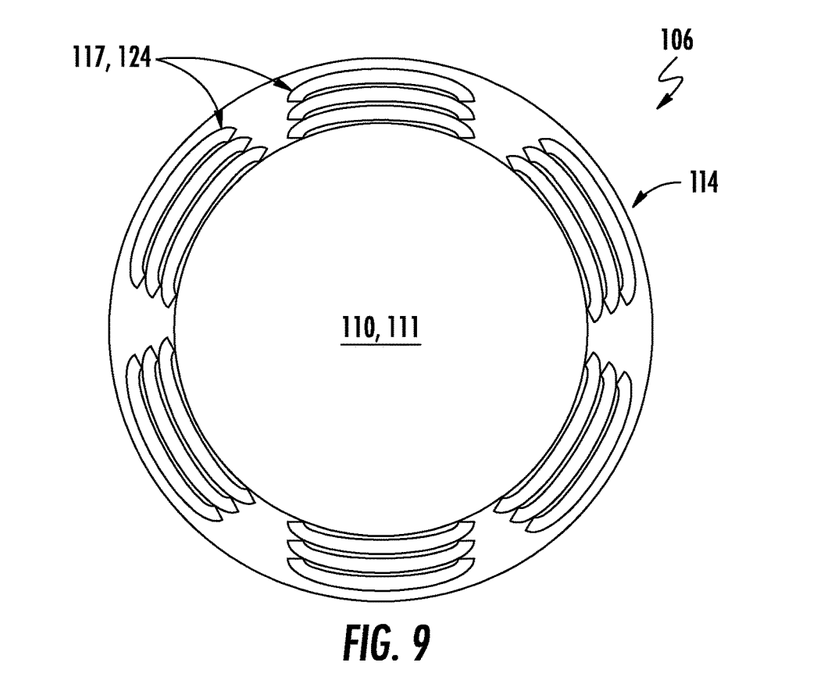
FIG. 9 illustrates a front view of still another embodiment of a bearing assembly of the rotor support system according to the present disclosure.

Referring now to FIG. 9, in another embodiment, each of the circumferentially-spaced dampers 117 of the damper assembly 114 may be constructed of one or more corrugated plates 124. For example, as shown, each of the dampers 117 may be constructed of a stack of corrugated plates 124, with each of the plates 124 being constructed of the shape memory alloys described herein.

Figure 10:
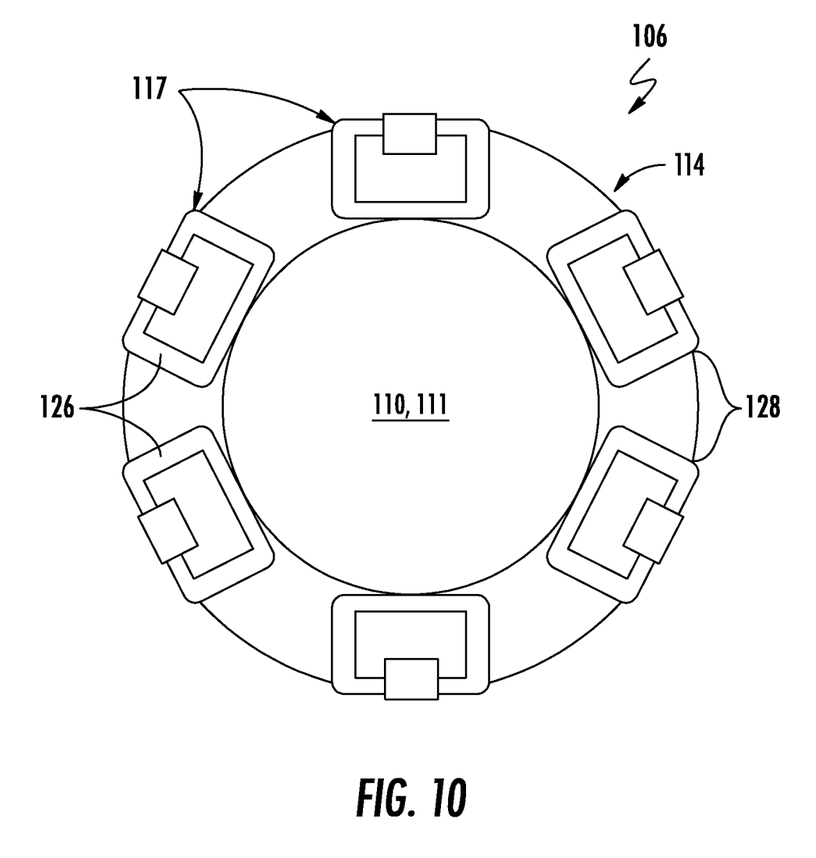
FIG. 10 illustrates a front view of yet another embodiment of a bearing assembly of the rotor support system according to the present disclosure.

In yet another embodiment, as shown in FIG. 10, each of the circumferentially-spaced dampers 117 may define a box structure 126. Moreover, each of the dampers 117 may be constructed of shape memory alloys described herein. In such embodiments, each of the box structures 126 may also define a stop feature 128 designed to restrict a deflection of the damping assembly 114.

Figure 11:
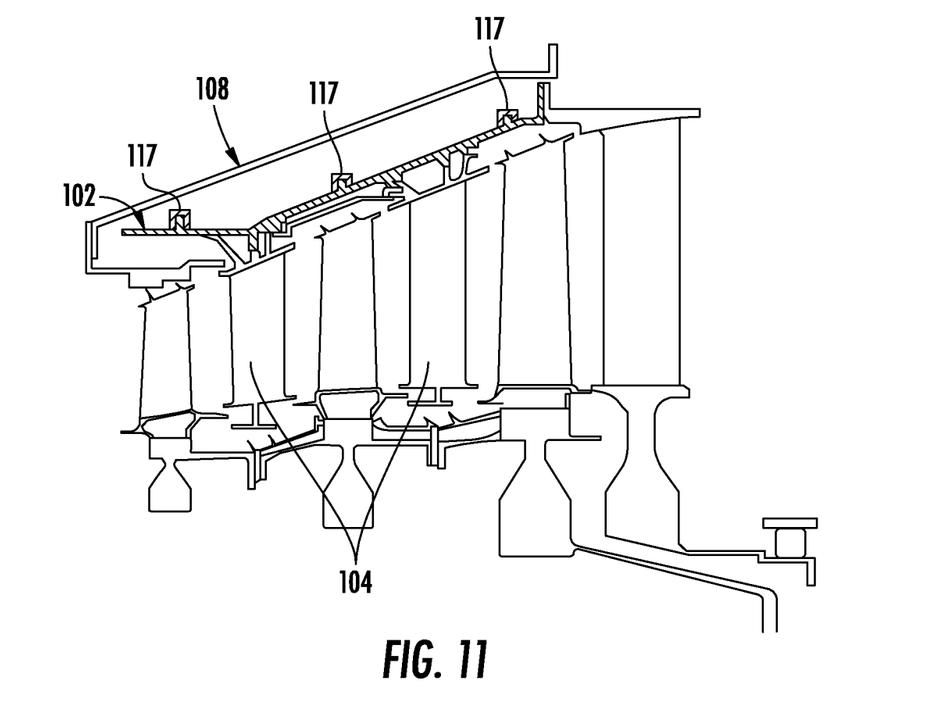
FIG. 11 illustrates a cross-sectional view of another embodiment of a section of a gas turbine engine, particularly illustrating a damper assembly positioned between a rotatable drum rotor and a support frame according to the present disclosure.
Figure 12:
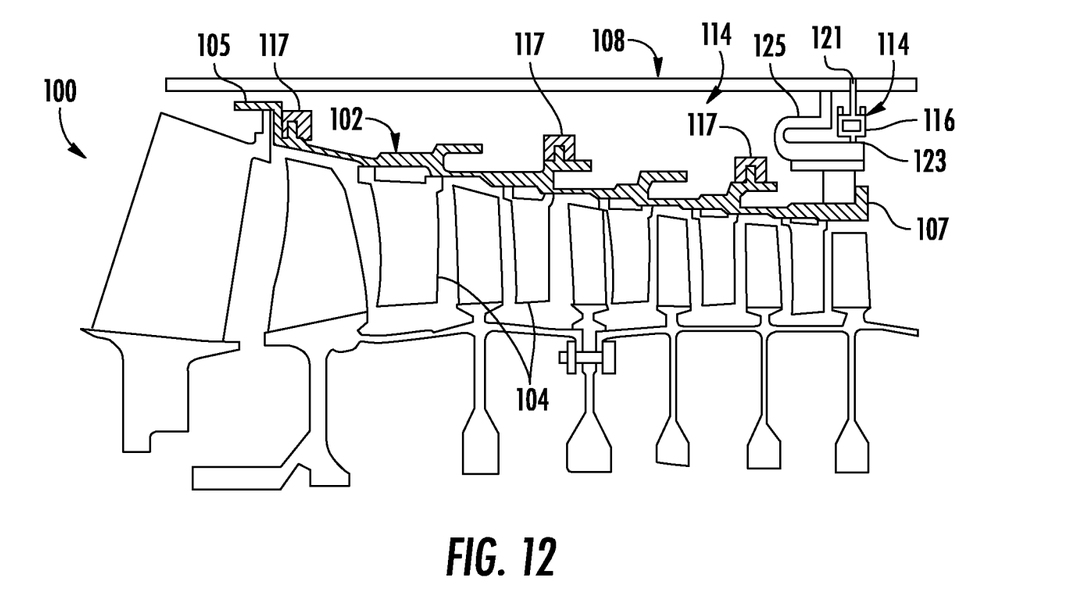
FIG. 12 illustrates a cross-sectional view of another embodiment of a section of a gas turbine engine, particularly illustrating a damper assembly positioned between a rotatable drum rotor and a support frame according to the present disclosure.

In still further embodiments, as shown in FIGS. 11 and 12, the damping assembly 114 may include one or more sleeve dampers 117 secured to an interior and/or exterior surface of the rotatable drum rotor 102. Thus, in such embodiments, controlling the response of the diametral modes of the rotatable drum rotor 102 using such sleeve dampers can be more weight efficient than, e.g. adding stiffeners. More specifically, as shown, FIG. 11 corresponds to a low-pressure turbine having a plurality of sleeve dampers 117 on the rotatable drum rotor 102, however, such dampers can be used in any module of the gas turbine engine. For example, FIG. 12 corresponds to a compressor module having a plurality of sleeve dampers 117 on the rotatable drum rotor 102.

Further, as shown, the damping assembly 114 may include a plurality of sleeve dampers 117 arranged in series on the interior and/or exterior surface of the rotatable drum rotor 102, e.g. so as to provide external damping due to friction when the drum diametral modes are excited. In other words, in such embodiments, as shown, the sleeve damper(s) 117 may be directly mounted on the rotatable drum rotor 102 (rather than be being mounted to another any static support structure). Moreover, in such embodiments, as shown, the sleeve damper(s) 117 may be rotating.

Such sleeve dampers 117 may be constructed of any suitable material, such as for example, a shape memory alloy as described herein or a metal material. As such, the sleeve dampers 117 are configured to provide damping to any diametral modes of the rotatable drum rotor 102. For shape memory alloys, the sleeve dampers provide hysteresis damping when they are exercised during the diametral modes of the rotatable drum rotor 102. Shape memory alloy-based sleeve dampers can also be pre-strained to offer high damping. For metal materials, the friction between the metal sleeve and the rotatable drum rotor 102 causes damping. Moreover, the sleeve dampers 117 described herein are configured to ovalize along with the structural components of the gas turbine engine, e.g. the rotatable drum rotor 102.

Various aspects and embodiments of the present invention are defined by the following numbered clauses:

Clause 1. A gas turbine engine, comprising:
a rotatable drum rotor comprising a plurality of blades secured thereto, the plurality of blades extending radially inward of the rotatable drum rotor;
a support frame mounted radially outward of the rotating drum rotor;
a rotor support system comprising a bearing assembly positioned between the rotatable drum rotor and the support frame, the bearing assembly comprising, at least, a stationary component and at least one rotatable component; and
a damper assembly secured between the support frame and the rotatable drum rotor, the damper assembly comprising at least one damper secured between the support frame and the stationary component of the bearing assembly or to a surface of the rotatable drum rotor, the at least one damper configured to provide damping to the rotatable drum rotor during operation of the gas turbine engine.

Clause 2. The gas turbine engine of clause 1, wherein the at least one damper comprises at least one of a shape memory alloy damper, a metal damper, a fluid-based damper, a spring-type damper, one or more sleeve dampers, or combinations thereof.

Clause 3. The gas turbine engine of any of the preceding clauses, wherein the at least one damper comprises the one or more sleeve dampers, the one or more sleeve dampers comprising a plurality of sleeve dampers arranged in series on the exterior surface or an interior surface of the rotatable drum rotor.

Clause 4. The gas turbine engine of any of the preceding clauses wherein the stationary component and the at least one rotatable component of the bearing assembly comprises a stationary race and a plurality of roller elements, respectively.

Clause 5. The gas turbine engine of any of the preceding clauses, wherein the stationary race corresponds to an outer race of the bearing assembly.

Clause 6. The gas turbine engine of any of the preceding clauses, wherein the stationary race corresponds to or an inner race of the bearing assembly.

Clause 7. The gas turbine engine of any of the preceding clauses, wherein the bearing assembly comprises a plurality of roller bearings circumferentially spaced about the rotatable rotor drum and secured to the support frame via a stationary support frame, the stationary component and the at least one rotatable component of the bearing assembly comprising the stationary support frame and the plurality of roller bearings, respectively.

Clause 8. The gas turbine engine of any of the preceding clauses, wherein the at least one damper of the damper assembly is constructed of one or more ring-shaped members, one or more of the ring-shaped members connected via one or more radially-extending struts Clause 9. The gas turbine engine of any of the preceding clauses, wherein the damper assembly comprises a plurality of circumferentially-spaced dampers each constructed of one or more corrugated plates having a leaf-spring arrangement.

Clause 10. The gas turbine engine of any of the preceding clauses, wherein the damper assembly comprises a plurality of circumferentially-spaced dampers each comprising a box structure, each of the box structures defining a stop feature designed to restrict a deflection of the damping assembly.

Clause 11. The gas turbine engine of any of the preceding clauses, wherein the at least one damper of the damper assembly is pre-strained.

Clause 12. The gas turbine engine of any of the preceding clauses, wherein the rotatable drum rotor is part of a compressor section, a turbine section, or a combustion section of the gas turbine engine.

Clause 13. A rotor support system for a gas turbine engine, the gas turbine engine comprising a rotatable drum rotor and a support frame, the rotor support system comprising:
a bearing assembly configured for positioning between the rotatable drum rotor and the support frame, the bearing assembly comprising, at least, a stationary component and at least one rotatable component; and
a damper assembly for securing between the support frame and the rotatable drum rotor, the damper assembly comprising at least one damper secured between the support frame and the stationary component of the bearing assembly or to a surface of the rotatable drum rotor, the at least one damper configured to provide damping to the rotatable drum rotor during operation of the gas turbine engine.

Clause 14. The rotor support system of clause 13, wherein the at least one damper comprises at least one of a shape memory alloy damper, a metal damper, a fluid-based damper, one or more sleeve dampers, a spring-type damper or combinations thereof.

Clause 15. The rotor support system of clauses 13-14, wherein the at least one damper comprises the one or more sleeve dampers, the one or more sleeve dampers comprising a plurality of sleeve dampers arranged in series on the exterior surface or an interior surface of the rotatable drum rotor.

Clause 16. The rotor support system of clauses 13-15, wherein the stationary component and the at least one rotatable component of the bearing assembly comprises a stationary race and a plurality of roller elements, respectively, and wherein the at least one damper of the damper assembly comprises a spring-like configuration.

Clause 17. The rotor support system of clauses 13-16, wherein the stationary race corresponds to at least one of an outer race of the bearing assembly or an inner race of the bearing assembly.

Clause 18. The rotor support system of clauses 13-17, wherein the bearing assembly comprises a plurality of roller bearings circumferentially spaced about the rotatable rotor drum and secured to the support frame via a stationary support frame, the stationary component and the at least one rotatable component of the bearing assembly comprising the stationary support frame and the plurality of roller bearings, respectively.

Clause 19. The rotor support system of clauses 13-18, wherein the at least one damper of the damper assembly is constructed of one or more ring-shaped members, one or more of the ring-shaped members connected via one or more radially-extending struts.

Clause 20. The rotor support system of clauses 13-19, wherein the at least one damper of the damper assembly is pre-strained.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine engine, comprising:
   a rotatable drum rotor comprising a plurality of blades secured thereto, the plurality of blades extending radially inward of the rotatable drum rotor;
   a support frame mounted radially outward of the rotatable drum rotor;
   a rotor support system comprising a bearing assembly positioned between the rotatable drum rotor and the support frame, the bearing assembly comprising, at least, a stationary component and at least one rotatable component; and
   a damper assembly secured between the support frame and the rotatable drum rotor, the damper assembly comprising a plurality of sleeve dampers arranged in series on a surface of the rotatable drum rotor, the plurality of sleeve dampers configured to provide damping to the rotatable drum rotor during operation of the gas turbine engine.

2. The gas turbine engine of claim 1, wherein the stationary component and the at least one rotatable component of the bearing assembly comprises a stationary race and a plurality of roller elements, respectively.

3. The gas turbine engine of claim 2, wherein the stationary race corresponds to an outer race of the bearing assembly.

4. The gas turbine engine of claim 2, wherein the stationary race corresponds to an inner race of the bearing assembly.

5. The gas turbine engine of claim 1, wherein the bearing assembly comprises a plurality of roller bearings circumferentially spaced about the rotatable drum rotor and secured to the support frame via a stationary support frame, the stationary component and the at least one rotatable component of the bearing assembly comprising the stationary support frame and the plurality of roller bearings, respectively.

6. The gas turbine engine of claim 1, wherein the plurality of sleeve dampers are pre-strained.

7. The gas turbine engine of claim 1, wherein the rotatable drum rotor is part of a compressor section, a turbine section, or a combustion section of the gas turbine engine.

8. A gas turbine engine, comprising:
   a rotatable drum rotor;
   a support frame; and
   a rotor support system comprising;
     a bearing assembly positioned between the rotatable drum rotor and the support frame, the bearing assembly comprising, at least, a stationary component and at least one rotatable component; and
     a damper assembly secured between the support frame and the rotatable drum rotor, the damper assembly comprising at least one damper secured between the support frame and the stationary component of the bearing assembly or to a surface of the rotatable drum rotor, the at least one damper being constructed of one or more ring-shaped members, one or more of the ring-shaped members connected via one or more radially-extending struts, the at least one damper configured to provide damping to the rotatable drum rotor during operation of the gas turbine engine, the at least one damper of the damper assembly being pre-strained.

9. The gas turbine engine of claim 8, wherein the stationary component and the at least one rotatable component of the bearing assembly comprises a stationary race and a plurality of roller elements, respectively.

10. The gas turbine engine of claim 9, wherein the stationary race corresponds to at least one of an outer race of the bearing assembly or an inner race of the bearing assembly.

11. The gas turbine engine of claim 8, wherein the bearing assembly comprises a plurality of roller bearings circumferentially spaced about the rotatable drum rotor and secured to the support frame via a stationary support frame, the stationary component and the at least one rotatable component of the bearing assembly comprising the stationary support frame and the plurality of roller bearings, respectively.

12. A gas turbine engine, comprising:
    a rotatable drum rotor;
    a support frame; and
    a rotor support system comprising;
      a bearing assembly positioned between the rotatable drum rotor and the support frame, the bearing assembly comprising, at least, a stationary component and at least one rotatable component; and
      a damper assembly secured between the support frame and the rotatable drum rotor, the damper assembly comprising a plurality of circumferentially-spaced dampers spaced apart from each other via a gap and secured between the support frame of the gas turbine engine and the stationary component of the bearing assembly or to a surface of the rotatable drum rotor of the gas turbine engine, the plurality of circumferentially-spaced dampers configured to provide damping to the rotatable drum rotor during operation of the gas turbine engine.

13. The gas turbine engine of claim 12, wherein each of the plurality of circumferentially-spaced dampers are constructed of one or more corrugated plates having a leaf-spring arrangement.

14. The gas turbine engine of claim 12, wherein each of the plurality of circumferentially-spaced dampers comprises a box structure, each of the box structures defining a stop feature designed to restrict a deflection of the damping assembly.

* * * * *